April 17, 1951     J. S. JARDIM     2,549,475
INFLATABLE TUBE FOR RAISING FISH NETS
Filed Feb. 8, 1945
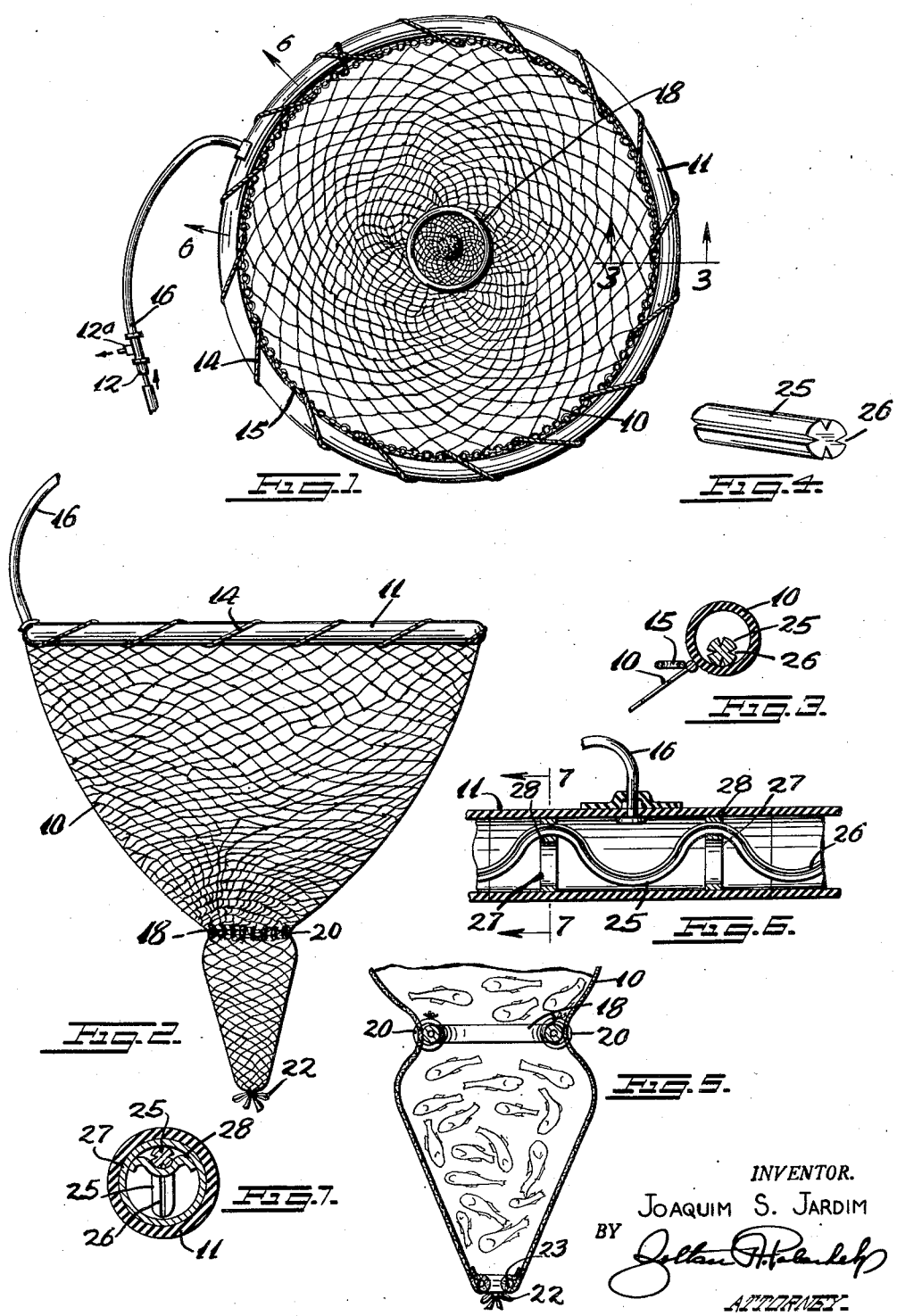
INVENTOR.
JOAQUIM S. JARDIM
BY
ATTORNEY Patented Apr. 17, 1951

2,549,475

UNITED STATES PATENT OFFICE 2,549,475

INFLATABLE TUBE FOR RAISING FISH NETS

Joaquim S. Jardim, Newark, N. J.

Application February 8, 1945, Serial No. 576,786

3 Claims. (Cl. 43—7)

This invention relates to new and useful improvements in inflatable raisable fish nets.

More particularly, the invention proposes an improved fish net which is characterized by a basket-like net body having the usual open top. It is proposed to provide an inflatable tube arranged so that it may be collapsed to permit the net to sink in water, and may be inflated to cause the net to rise and so catch the fish.

The invention proposes to mount sinkers, in the nature of a chain, around the top portion of the net to sink the net when the inflatable tube is deflated.

It is proposed to connect a small diameter tube with the inflatable tube in such a way that the inflatable tube may be filled with air when it is required that the fish net should rise.

Still further the invention proposes the provision of a flexible cord-like member extending longitudinally through the inflatable tube and arranged in such a fashion that the inflatable tube cannot be collapsed completely, or to such an extent that it cannot be inflated due to the fact that the air would be excluded from the interior of the tube.

Still further the invention proposes an inflatable raisable fish net as briefly mentioned, which is simple and efficient and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of an inflatable raisable fish net, constructed in accordance with this invention.

Fig. 2 is a side elevational view of Fig. 1.

Fig. 3 is a fragmentary enlarged sectional view taken on the line 3—3 of Fig. 1.

Fig. 4 is a fragmentary perspective view of a length of the flexible cord-like member which is disposed within the inflatable tube.

Fig. 5 is a fragmentary enlarged vertical sectional view of the bottom portion of Fig. 2.

Fig. 6 is a fragmentary developed sectional view taken on the line 6—6 of Fig. 1.

Fig. 7 is a transverse sectional view taken on the line 7—7 of Fig. 6.

The inflatable raisable fish net, in accordance with this invention, includes a basket-like net body 10 constructed of the usual cords, or similar materials, and having an open top. An inflatable raisable tube 11 is mounted around the open top, an inlet valve 12 is provided for inflating the tube 11 and a discharge valve 12a is provided for deflating the same. The tube 11 is secured to the top edge portion of the net body 10 by a cord 14 wound around the tube and laced through the top portion of the net body 10. Sinkers 15 are mounted around the open top of the net body 10. These sinkers 15 comprise a length of chain secured in position about the open top of the net body 10 by having the cord 14 laced through certain of the links thereof.

A small diameter rubber tube 16 extends from the tube 11 and carries the tire valve 12 through which air may be supplied for inflating the tube 11. The bottom of the net body 10 is partially restricted with a constricting rubber ring 18 mounted about the bottom portion of the net body 10 a short distance above the extreme bottom end. The ring 18 is tied with cords 20, or in any other way secured so as to hold the bottom portion of the net body 10 in a gathered condition. A draw string 22 is threaded through a hem portion 23 formed along the open bottom of the net body 10. This draw string 22 is normally tied so as to hold the bottom of the net body 10 closed. When the draw string 22 is slackened it is possible to discharge fish caught in the net body through the open bottom of the net body.

A flexible cord-like member 25 formed with longitudinally extending external air grooves 26, is located within the inflatable tube 11 for preventing complete collapsing of the inflatable tube 11. This cord-like member 25 has a central slack area located directly opposite the point where the tube 16 is connected with the tube 11, see Fig. 6. The cord-like member 25 is retained in a serpentine formation within the tube 11 by spaced rings 27 mounted in position in the tube 11. The rings 27 have loop portions 28 through which the cord-like member 25 passes. The collapsible tube 11 may be constructed of a length of rubber hose, into the ends of which the rings 27 are forced, so that they maintain fixed positions. The ends of the rubber hose are vulcanized, or in any other way connected together so as to seal the inflatable tube 11.

The operation of the inflatable raisable fish net is as follows:

The discharge valve 12a is opened and the air is discharged from the tube 11 by compressing it.

The discharge valve 12ª is closed and the net is then dropped into water and it will sink. The inflatable tube 11 cannot be totally collapsed by the pressure of the water against the sides thereof because of the flexible cord-like member 25 and the rings 27.

When it is desired to raise the net, air is blown or pumped into the tube 16 to by-pass the inlet valve 12 and inflate the tube 11. The air can always reach around the inflatable tube 11 because the cord-like member 25 pevents the tube 11 from collapsing completely. The air can always run along through the grooves 26 in the cord-like member 25 and in this way reach all points within the collapsible tube 11. When the tube 11 becomes inflated it will float and will raise the fish net body 10. Then the top portion of the net body 10 may be squeezed closed, and the draw string 22 opened, so that the catch of fish may be funneled out of the net body 10 through the ring 18.

While I have illustrated and described the prepreferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. In an article of the class described, an inflatable circular tube, a continuous flexible cordlike member having longitudinally extending air grooves located within said inflatable tube for preventing complete collapsing of said inflatable tube and for providing a stiffening structure when said inflatable tube is partially collapsed, spaced rings transversely mounted within said inflatable tube and loop portions formed on said rings through which said flexible cordlike member passes for supporting the same.

2. In an article of the class described, an inflatable tube, a flexible cord-like member having longitudinally extending air grooves located within said inflatable tube for preventing complete collapsing of said inflatable tube and for providing a stiffening structure when said inflatable tube is partially collapsed, and means for holding said cord-like member in a serpentine formation within said inflatable tube.

3. In an article of the class described, an inflatable tube, a flexible cord-like member having longitudinally extending air grooves located within said inflatable tube for preventing complete collapsing of said inflatable tube and for providing a stiffening structure when said inflatable tube is partially collapsed, a plurality of rings mounted at spaced points within said inflatable tube, and loops formed on the inner peripheries of said rings, said cord-like member being laced through said loops to be held in a serpentine formation thereby.

JOAQUIM S. JARDIM.

REFERENCES CITED

The following references are of record in the file of this patent:

UNITED STATES PATENTS

| Number | Name | Date |
| --- | --- | --- |
| 312,965 | Bullivant | Feb. 24, 1885 |
| 528,350 | Trouve | Oct. 30, 1894 |
| 1,585,483 | Freer | May 18, 1926 |
| 2,216,871 | Banks | Oct. 8, 1940 |

FOREIGN PATENTS

| Number | Country | Date |
| --- | --- | --- |
| 3,099 | Great Britain | Dec. 17, 1860 |
| 27,348 | Norway | Oct. 16, 1916 |
| 420,067 | France | Jan. 21, 1911 |
| 568,221 | France | Dec. 18, 1923 |